United States Patent
Nagai et al.

(10) Patent No.: US 9,728,764 B2
(45) Date of Patent: Aug. 8, 2017

(54) ALKALINE STORAGE BATTERY

(71) Applicants: FDK CORPORATION, Minato-ku, Tokyo (JP); LITTELFUSE JAPAN G.K., Minato-ku, Tokyo (JP)

(72) Inventors: Tatsuya Nagai, Tokyo (JP); Koji Izumi, Tokyo (JP)

(73) Assignees: FDK CORPORATION, Minato-ku, Tokyo (JP); LITTELFUSE JAPAN G.K., Minato-Ku, Tokyo (JP)

( * ) Notice: Subject to any disclaimer, the term of this patent is extended or adjusted under 35 U.S.C. 154(b) by 12 days.

(21) Appl. No.: 14/420,629

(22) PCT Filed: Aug. 7, 2013

(86) PCT No.: PCT/JP2013/071346
§ 371 (c)(1),
(2) Date: Feb. 9, 2015

(87) PCT Pub. No.: WO2014/024915
PCT Pub. Date: Feb. 13, 2014

(65) Prior Publication Data
US 2015/0221928 A1 Aug. 6, 2015

(30) Foreign Application Priority Data
Aug. 10, 2012 (JP) .................................. 2012-178310

(51) Int. Cl.
*H01M 2/34* (2006.01)
*H01M 2/02* (2006.01)
(Continued)

(52) U.S. Cl.
CPC .......... *H01M 2/348* (2013.01); *H01M 2/022* (2013.01); *H01M 2/08* (2013.01); *H01M 2/263* (2013.01);
(Continued)

(58) Field of Classification Search
CPC .............. H01M 10/286; H01M 10/30; H01M 2200/106; H01M 2220/30; H01M 2/022; H01M 2/08; H01M 2/263; H01M 2/348
See application file for complete search history.

(56) References Cited

U.S. PATENT DOCUMENTS 7,294,433 B2 * 11/2007 Murashige ............ H01M 2/266
429/153
2003/0026053 A1 2/2003 Toth et al.
(Continued)

FOREIGN PATENT DOCUMENTS

CN 1630918 A 6/2005
JP 06-243856 9/1994
(Continued)

OTHER PUBLICATIONS

Extended European Search Report for EP 13828050.8, mailed Nov. 26, 2015.
(Continued)

*Primary Examiner* — Carlos Barcena
(74) *Attorney, Agent, or Firm* — Marshall, Gerstein & Borun LLP

(57) ABSTRACT

The present invention provides a heat suppressing alkaline storage battery including a positive electrode lead having a downsized portion that incorporates a PTC thermistor. A battery includes a positive electrode lead having a first lead half body, a second lead half body, and a PTC thermistor, the first and second lead half bodies overlap end portions formed in a portion where the first and second lead half bodies overlap with each other, the overlap end portions being larger than the PTC thermistor as viewed from a plane and being in contact with the PTC thermistor, the PTC thermistor is fitted in a fitting recessed portion formed in the overlap end portion of the first lead half body, and an exposed portion of the PTC thermistor is covered with a protective material.

8 Claims, 8 Drawing Sheets

(51) Int. Cl.
*H01M 2/08* (2006.01)
*H01M 10/30* (2006.01)
*H01M 2/26* (2006.01)
*H01M 10/28* (2006.01)

(52) U.S. Cl.
CPC .......... *H01M 10/286* (2013.01); *H01M 10/30* (2013.01); *H01M 2200/106* (2013.01); *H01M 2220/30* (2013.01); *Y02E 60/124* (2013.01); *Y02P 70/54* (2015.11)

(56) References Cited

U.S. PATENT DOCUMENTS

2012/0052344 A1* 3/2012 Nagai ..................... H01M 2/34
429/61
2013/0196182 A1* 8/2013 Tanaka ................. H01C 1/1406
429/7

FOREIGN PATENT DOCUMENTS

| JP | 2011-151207 A | 8/2011 |
| JP | 2012-054099   | 3/2012 |
| JP | 2012-054099 A | 3/2012 |
| JP | 2013-065611 A | 4/2013 |

OTHER PUBLICATIONS

Search Report for PCT/JP2013/071346, mailed Sep. 17, 2013.
Written Opinion for PCT/JP2013/071346, mailed Sep. 17, 2013.
Office Action issued in Chinese Patent Application No. 201380049725.3, dated Feb. 16, 2017.

* cited by examiner

ALKALINE STORAGE BATTERY

TECHNICAL FIELD

The present invention relates to an alkaline storage battery.

BACKGROUND ART

To manufacture general alkaline storage batteries, an electrode group made up of a positive electrode, a negative electrode and a separator is housed in an outer can serving also as a negative electrode terminal, an alkaline electrolyte is injected into the outer can, and then an upper end opening of the outer can is sealed with a sealing body. This sealing body has a lid plate which is fixed to the upper end opening of the outer can via an insulating packing material, and a positive electrode terminal electrically connected to the lid plate.

In such alkaline storage batteries, the negative electrode at the outermost periphery of the electrode group is in contact with an inner wall of the outer can, so that the negative electrode and the outer can (negative electrode terminal) are electrically connected to each other. Meanwhile, the positive electrode in the electrode group is connected to one end of a positive electrode lead made of a belt-like metal. The other end of the positive electrode lead is connected to the lid plate. Consequently, the positive electrode is electrically connected to the positive electrode terminal via the positive electrode lead and the lid plate.

It is known that when such alkaline storage batteries cause an external short circuit, an excess current flows inside the batteries and heat is generated.

Accordingly, in the alkaline storage batteries, it is necessary to secure the safety of the batteries at the occurrence of the external short circuit. One of the methods to secure the safety of the batteries is known to use, for example, a positive electrode lead that incorporates a positive temperature coefficient (PTC) thermistor (see, for example, Patent Document 1). This PTC thermistor is an electronic component made of a resin containing conductive particles. The PTC thermistor has characteristics to have a low electric resistance value and good conductivity in normal conditions but to have a rapid increase in the electric resistance value when the temperature of the PTC thermistor increases and reaches a specified value.

The PTC thermistor incorporated in the positive electrode lead functions as shown below on the occasion of an external short circuit.

First, when a battery including the positive electrode lead that incorporates the PTC thermistor makes an external short circuit due to a certain cause, an excess current flows inside the battery. With the excess current flow, a large current also flows to the PTC thermistor, which causes an increase in temperature of the PTC thermistor. When the temperature of the PTC thermistor reaches a specified value, the electric resistance value of the PTC thermistor increases. Consequently, electric conduction from the electrode group to the positive electrode terminal is suppressed at a portion of the PTC thermistor in the positive electrode lead. As a result, the excess current flow inside the battery is suppressed, and heat generation is suppressed thereby.

Conventional positive electrode leads that incorporate the PTC thermistor are manufactured according to the following steps for example. First, two metal band-shaped bodies and a rectangular PTC thermistor are prepared. These band-shaped bodies are placed in series and are made to face each other at an interval so that their tip portions partially overlap with each other. The PTC thermistor is placed between the tip portions which face each other at an interval. The tip portions of these band-shaped bodies and the PTC thermistor are stacked. The upper and lower surfaces of the PTC thermistor and the tip portions of the respective band-shaped bodies which overlap with each other are joined by, for example, soldering. Accordingly, a positive electrode lead that has the PTC thermistor therein is obtained. Here, when the positive electrode lead as described above is manufactured, the PTC thermistor is soldered with the band-shaped bodies in the state of, for example, being held by a specialized tool. In this case, in order to prevent the specialized tool and the band-shaped bodies from touching each other, the band-shaped bodies having tip portions smaller than the PTC thermistor as viewed from a plane are used. Accordingly, in the obtained positive electrode lead, the area of a portion of the PTC thermistor which is not covered with the tip portions of the band-shaped bodies, i.e., the area of an exposed surface of the PTC thermistor, becomes relatively large.

The positive electrode lead that incorporates the PTC thermistor is placed between the sealing body and the electrode group in an upper space inside the can. The upper space inside the can is filled with gas atmosphere that is a mixture of both an oxygen component (high-pressure oxygen atmosphere) generated by chemical reactions at the time of charge and discharge and an alkaline component (alkaline atmosphere) derived from electrolyte inside the battery.

In this case, when the PTC thermistor is exposed to the oxygen atmosphere and the alkaline atmosphere, the function of the PTC thermistor as a positive electrode lead that can suppress current may be compromised under the influence of the oxygen component and the alkaline component. Specifically, the oxygen component in the atmosphere erodes constituent materials of the PTC thermistor, which causes the PTC thermistor to be deteriorated. Moreover, the alkaline component not only erodes general resin but also erodes a soldering portion (joined portion) where the constituent materials of the PTC thermistor and the positive electrode lead are bonded. This may cause deterioration and detachment of the PTC thermistor. Such failures attributed to the oxygen component and the alkali component tend to occur more as the exposed area of the PTC thermistor is larger.

Accordingly, to eliminate such failures, generally the PTC thermistor is sealed with a synthetic resin material so as to prevent contact with oxygen, and further a portion in the positive electrode lead that incorporates the PTC thermistor is entirely coated with a large-sized masking tape having alkali resistance so as to prevent corrosion caused by the alkaline component. Thus, measures are taken to protect the PTC thermistor from oxygen atmosphere and the alkaline atmosphere.

In the conventional positive electrode leads that incorporate the PTC thermistor as described above, the exposed area of the PTC thermistor is relatively large, so that a larger amount of the synthetic resin material is used for protective measures. Since the synthetic resin material is further covered with the masking tape, the portion that incorporates the PTC thermistor becomes relatively bulky. Accordingly, it is necessary to secure a relatively large space between the sealing body and the electrode group inside the battery where the positive electrode lead is housed. Accordingly, the batteries including the positive electrode lead that incorporates the PTC thermistor are limited to relatively large batteries of AA size or larger.

PRIOR ART DOCUMENT

Patent Document

Patent Document 1: Japanese Patent Laid-Open No. 06-243856

SUMMARY OF THE INVENTION

Problems to be Solved by the Invention

In recent years, in the fields of portable electronic apparatuses, toys and the like, downsizing of the apparatuses is progressing. Accordingly, demand for smaller batteries for use in these apparatuses is increasing. Specifically, demand for AAA-size batteries is increasing.

When a long conductive member is present around a battery, this member may come into contact with a positive electrode terminal and a negative electrode terminal for some reason, and may cause the battery to make an external short circuit. Since a distance between the positive electrode terminal and the negative electrode terminal is relatively short in the AAA-size battery, the AAA-size battery is considered to be more likely to make such an external short circuit than the batteries of larger size. Therefore, for smaller-sized batteries, it is more recommended to mount the PTC thermistor in order to enhance the safety.

However, since the capacity of the outer can of the AAA-size battery is small, an upper space inside the can that houses the positive electrode lead is also small. Accordingly, it is difficult to use the positive electrode lead that incorporates the PTC thermistor in the AAA-size battery.

Moreover, in the portable electronic apparatuses and the like, higher performance is also being pursued. In this connection, the batteries for use in these apparatuses are also required to have higher performance, and so the batteries are expected to have more advanced features, and have increased capacity in particular. The capacity of the batteries is increased typically by increasing the amount of active materials housed in the batteries, i.e., by enlarging the electrode group.

When an external short circuit occurs, the batteries having increased capacity have larger heat values than batteries having lower capacity. Consequently, the batteries having higher capacity are more recommended to mount the PTC thermistor for further enhancement of safety.

However, since the batteries having increased capacity have an enlarged electrode group, it is difficult to secure the space for housing elements other than the electrode group. This also makes it difficult to use the positive electrode lead that incorporates the PTC thermistor in the batteries having increased capacity.

The present invention has been made based on the above-described circumstances, and an object of the present invention is to provide an alkaline storage battery including a positive electrode lead having a portion that incorporates a PTC thermistor being downsized so as to be placed in a smaller space than before, the alkaline storage battery being capable of suppressing heat generation on the occasion of an external short circuit.

Means for Solving the Problems

In order to accomplish the above object, there is provided an alkaline storage battery according to the present invention, including: an outer can having an open upper end; an electrode group including a positive electrode and a negative electrode that are stacked via a separator, the electrode group being housed in the outer can together with alkali electrolyte; a sealing body fixed to an opening edge of the outer can in an insulated state, the sealing body having a lid plate that seals the opening and a positive electrode terminal electrically connected to the lid plate; and a positive electrode lead that electrically connects the positive electrode and the sealing body, wherein the positive electrode lead includes a first lead half body electrically connected to the sealing body, a second lead half body electrically connected to the positive electrode, and a PTC thermistor disposed between the first lead half body and the second lead half body, the first lead half body and the second lead half body respectively have overlap end portions formed in a part where the first lead half body and the second lead half body overlap with each other, the overlap end portions being larger than the PTC thermistor as viewed from a plane and being in contact with the PTC thermistor, the PTC thermistor is fitted in a fitting recessed portion formed in the overlap end portion of at least one of the first lead half body and the second lead half body, and an exposed portion of the PTC thermistor which is not covered with the overlap end portions of the first lead half body and the second lead half body is covered with a protective material.

The protective material is preferably made of resin having both oxygen resistance and alkali resistance.

The PTC thermistor preferably has operating temperature set to 80° C. to 100° C.

Advantageous Effects of the Invention

In the alkaline storage battery according to the present invention, the size of the overlap end portions in the first and second lead half bodies, which form a positive electrode lead, is set larger than the PTC thermistor. Furthermore, the overlap end portions are provided with a fitting recessed portion into which the PTC thermistor is fitted. Accordingly, the upper and lower surfaces of the PTC thermistor, as well as the lateral surface of a portion of the PTC thermistor fitted in the fitting recessed portion are covered with the lead half bodies. As a result, the PTC thermistor has an exposed surface only in a part of the lateral surface portion which is not covered with the lead half bodies, so that the exposed surface becomes smaller than that in the conventional PTC thermistors. In short, the area which should be covered with resin becomes smaller than that in the conventional PTC thermistors. Consequently, a smaller amount of resin can be used for protection of the PTC thermistor, so that the portion that incorporates the PTC thermistor can be made less bulky than before. This makes it possible to mount the PTC thermistor on batteries having difficulty in securing a space inside the outer can, such as small batteries and batteries having increased capacity, so that heat generation on the occasion of an external short circuit can be suppressed.

Moreover, if a resin having both oxygen resistance and alkali resistance is adopted as the resin to be used, it becomes unnecessary to separately cover the portion that incorporates the PTC thermistor with a masking tape having alkali resistance. Therefore, it becomes easy to downsize the portion that incorporates the PTC thermistor in the positive electrode lead.

Moreover, since positioning of the PTC thermistor can easily be performed by fitting the PTC thermistor in the fitting recessed portion, it is not needed to hold the PTC thermistor with a specialized tool. Accordingly, manufacturing is facilitated and enhancement in manufacturing efficiency can be achieved. In addition, morphological stability can also be enhanced and a low defect rate can be achieved.

Furthermore, since the operating temperature of the PTC thermistor is set to 80° C. to 100° C., malfunction of the PTC thermistor can be prevented while excessive increase in surface temperature of the battery on the occasion of an external short circuit can reliably be suppressed.

MODE FOR CARRYING OUT THE INVENTION

Hereinafter, the battery according to the present invention will be described with reference to the drawings.

First Embodiment

A description is given of the case where the present invention is applied to, for example, a cylindrical nickel hydrogen storage battery (hereinafter referred to as a battery) 2 of AAA size illustrated in FIG. 1 as a battery of a first embodiment to which the present invention is applied.

Figure 1:
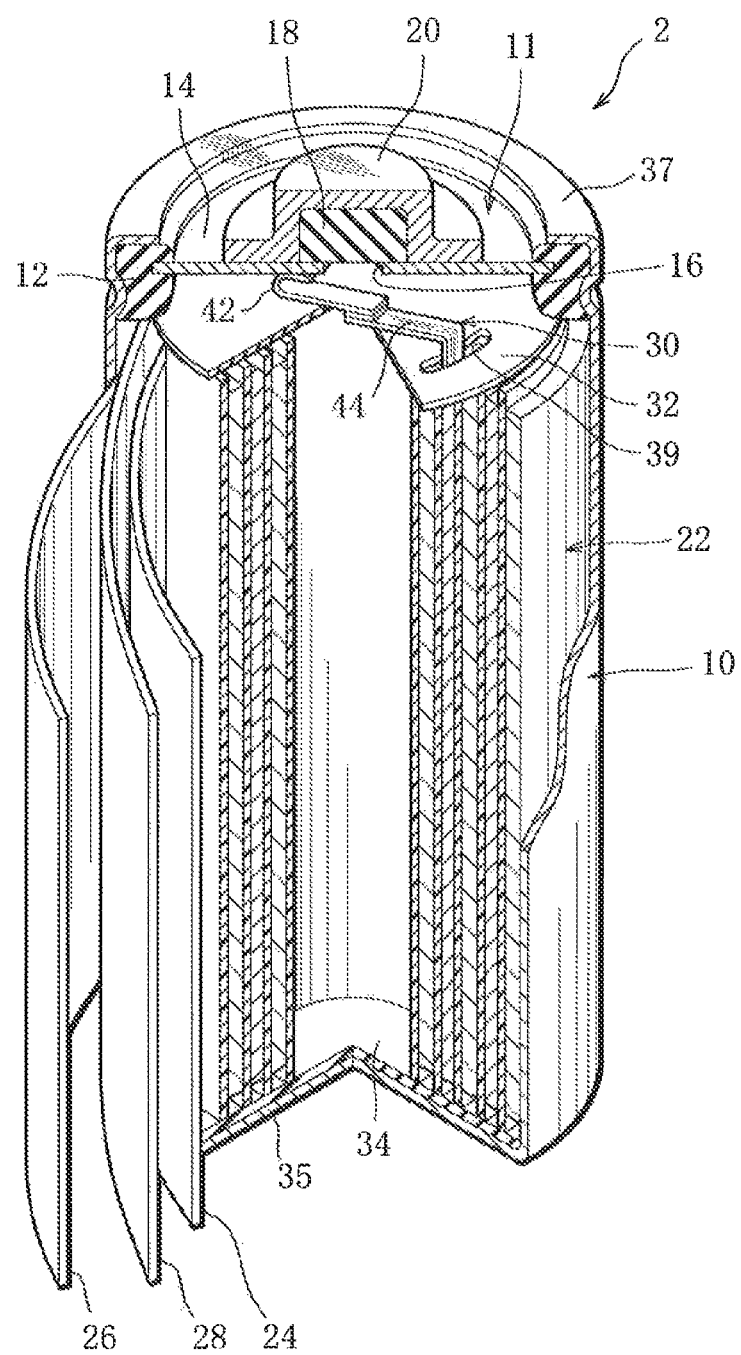
FIG. 1 is a perspective view illustrating a partially fractured nickel hydrogen storage battery in a cylindrical shape according to the present invention.

As illustrated in FIG. 1, the battery 2 includes an outer can 10 in the shape of a closed-end cylinder having an open upper end. The outer can 10 is conductive, and its bottom wall 35 functions as a negative electrode terminal. A sealing body 11 is fixed to the opening of the outer can 10. The sealing body 11 includes a lid plate 14 and a positive electrode terminal 20. The sealing body 11 seals the outer can 10 and provides the positive electrode terminal 20. The lid plate 14 is a disc-shaped member having conductivity. The lid plate 14 and a ring-shaped insulating packing material 12 surrounding the lid plate 14 are placed inside the opening of the outer can 10. The insulating packing material 12 is fixed to an opening edge 37 of the outer can 10 by caulking of the opening edge 37 of the outer can 10. That is, the lid plate 14 and the insulating packing material 12 work in unison to airtightly close the opening of the outer can 10.

In this case, the lid plate 14 has a central through hole 16 in the center. A valve disc 18 made of rubber is placed on an external surface of the lid plate 14 to close the central through hole 16. Further on the external surface of the lid plate 14, the cylindrical positive electrode terminal 20 having a collar head is fixed so as to cover the valve disc 18. The positive electrode terminal 20 presses the valve disc 18 toward the lid plate 14. A gas drainage hole not illustrated is opened on the positive electrode terminal 20.

The central through hole 16 is airtightly closed by the valve disc 18 under normal conditions. When gas is generated inside the outer can 10 and the internal pressure is increased thereby, the valve disc 18 is compressed by the internal pressure and the central through hole 16 is opened. As a result, the gas is released out of the outer can 10 through the central through hole 16 and the gas drainage hole of the positive electrode terminal 20. That is, the central through hole 16, the valve disc 18, and the positive electrode terminal 20 form a relief valve for the battery.

The outer can 10 houses an electrode group 22 together with alkali electrolyte (not illustrated). To prevent an internal short circuit, a circular insulating member 32 is placed between the electrode group 22 and the lid plate 14. A circular insulating member 34 is also placed between the electrode group 22 and the bottom wall 35 of the outer can 10.

The electrode group 22 is made up of a positive electrode 24, a negative electrode 26, and a separator 28, each having a belt-like shape. The electrode group 22 is spirally wound in the state of the separator 28 being interposed in between the positive electrode 24 and the negative electrode 26. In short, the positive electrode 24 and the negative electrode 26 are overlapped with each other via the separator 28. Here, the positive electrodes 24, the negative electrode 26, and the separator 28 are each equivalent to a positive electrode, a negative electrode, and a separator for use in publicly known nickel hydrogen storage batteries.

An outermost periphery of the electrode group 22 is formed by a part (outermost peripheral portion) of the negative electrode 26, and comes into contact with an inner peripheral wall of the outer can 10. That is, the negative electrode 26 and the outer can 10 are electrically connected to each other.

Meanwhile in the outer can 10, a positive electrode lead 30 is placed between the electrode group 22 and the lid plate 14. One end of the positive electrode lead 30 is connected to the positive electrode 24, and the other end is connected to the lid plate 14. Therefore, the positive electrode terminal 20 and the positive electrode 24 are electrically connected to each other via the positive electrode lead 30 and the lid plate 14. The positive electrode lead 30 extends through a slit 39 provided in the insulating member 32.

Hereinafter, the positive electrode lead 30 will be described in detail.

Figure 2:
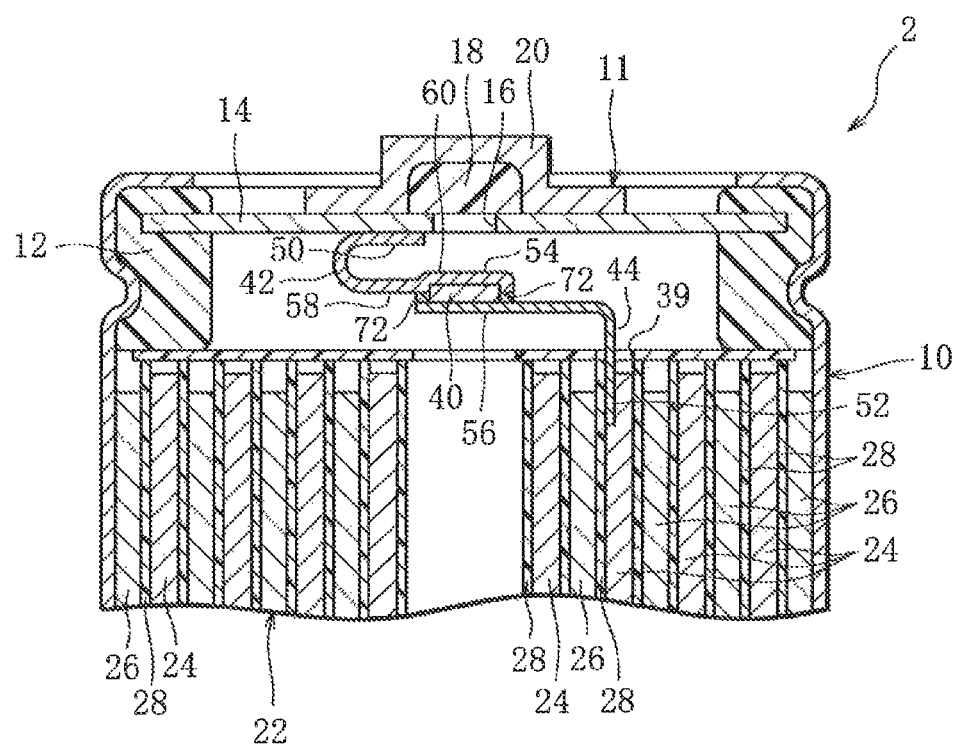
FIG. 2 is a cross sectional view illustrating an upper portion inside an outer can.

As illustrated in FIG. 2, the positive electrode lead 30 is formed by electrically connecting a first lead half body 42 and a second lead half body 44 in series with a PTC thermistor 40 interposed therebetween.

In this case, the PTC thermistor 40 is made of, for example, an insulating polymer having conductive particles dispersed therein. Under normal conditions, this type of PTC thermistor 40 has a low electric resistance value and demonstrates good conductivity since the conductive particles are in contact with each other. However, at the occurrence of an external short circuit, a large current flows and the PTC thermistor 40 generates heat. Since the heat expands the entire insulating polymer, the conductive particles in contact with each other decreases, resulting in rapid increase in the electric resistance value. The flow of current can be suppressed by using such characteristics. When the temperature falls and the insulating polymer cools down, the insulating polymer contracts. Consequently, the PTC thermistor 40 returns to the state of a low electric resistance value.

In the present invention, the operating temperature at which the electric resistance value of the PTC thermistor 40 starts to increase is preferably set to the range of 80° C. to 100° C. When the battery 2 is put in a relatively high temperature environment, such as inside a car in the summer time, the operating temperature set to 80° C. or lower may cause such malfunction that the current is suppressed even though an external short circuit is not made. Contrary to this, the operating temperature set to over 100° C. may cause failures such as the PTC thermistor not in operation even though the battery makes an external short circuit and is already at high temperature. In the present invention, the operating temperature of the PTC thermistor is preferably set to the range of 80° C. to 100° C. so that the surface temperature of the battery 2 does not exceed 70° C., which is the highest battery temperature prescribed, for example, in the domestic toy standard and so that malfunction of the battery 2 is suppressed. When the battery generates heat due to an external short circuit, temperature difference is generated between the inside of the battery and the exterior surface thereof. Accordingly, even if the operating temperature of the PTC thermistor is 80° C. to 100° C., the exterior surface temperature of the battery can be maintained at 70° C. or less. Specifically, even if the temperature of the PTC thermistor 40 present inside the battery 2 increases to the range of 80° C. to 100° C., the surface temperature of the battery 2 is about 50° C. to 55° C.

Figure 3:
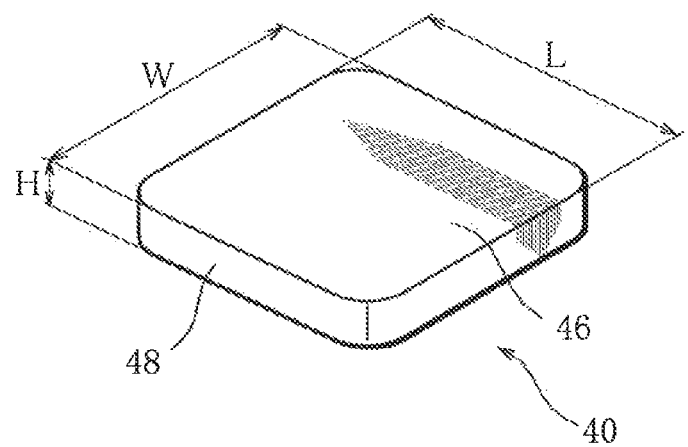
FIG. 3 is a perspective view illustrating a PTC thermistor.

The PTC thermistor 40 used in the present embodiment forms a generally rectangular plate shape having rounded corners as illustrated in FIG. 3. In FIG. 3, there is illustrated an upper end surface 46 positioned on the first lead half body 42 side. Although not illustrated in FIG. 3, a lower end surface 47 positioned on the second lead half body 44 side is present on the opposite side of the upper end surface 46. A length between the upper end surface 46 and the lower end surface 47 serves as a thickness of the PTC thermistor, which is expressed by reference character H in FIG. 3. FIG. 3 also illustrates a lateral surface 48 of the PTC thermistor.

Next, the first lead half body 42 and the second lead half body 44 are band-shaped bodies made of metal, respectively. Preferably examples of the metal band-shaped bodies include, for example, band-shaped bodies made of nickel and band-shaped bodies made of nickel plated steel sheet.

As is clear from FIG. 2, a base end portion 50 of the first lead half body 42 is joined to the lid plate 14 and is folded in a generally U-shape. A base end portion 52 of the second lead half body 44 is joined to the positive electrode 24 and is folded in an inversed L-shape. A tip portion of the first lead half body 42 and a tip portion of the second lead half body 44 overlap and face each other at an interval. The PTC thermistor 40 is disposed between the tip portions which face each other at an interval.

Figure 4:
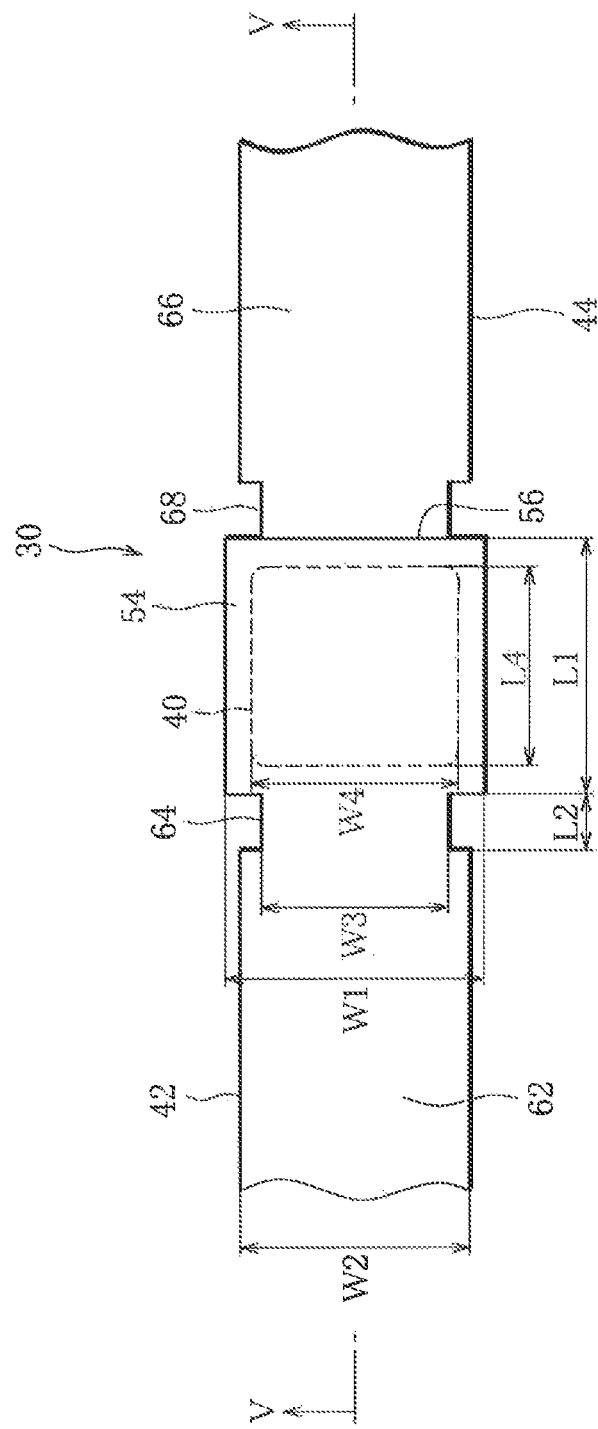
FIG. 4 is a plan view illustrating a positive electrode lead according to the present invention.

More specifically, the first lead half body 42 has a rectangular-shaped first overlap end portion 54 formed at the tip portion as illustrated in FIG. 4 which illustrates the positive electrode lead 30 as viewed from the first lead half body 42 side. A body portion 62 extends from a part of the first overlap end portion 54 on the side of the base end portion 50. A narrow portion 64 having a narrowed width is provided between the body portion 62 and the first overlap end portion 54. The narrow portion 64 is provided in order to enhance the flexibility of the first lead half body 42. The second lead half body 44 has a shape similar to that of the first lead half body 42 as viewed from a plane. Accordingly, the second lead half body 44 also has a second overlap end portion 56 formed at the tip portion, the second overlap end portion 56 having a rectangular shape similar to the first overlap end portion 54 as viewed from a plane. The second lead half body 44 also has a body portion 66 and a narrow portion 68 similar in shape to those of the first lead half body 42.

As described in the foregoing, the PTC thermistor 40 is placed between these overlap end portions 54 and 56. The upper end surface 46 of the PTC thermistor 40 is joined to the first overlap end portion 54, and the lower end surface 47 of the PTC thermistor is joined to the second overlap end portion 56. For example, soldering is used for this joining. Here, as is clear from FIG. 4, the first and second overlap end portions 54 and 56 have a rectangular shape larger than the PTC thermistor 40 as viewed from a plane. The first and second overlap end portions 54 and 56 are disposed so as to cover the entire upper end surface 46 and lower end surface 47 of the PTC thermistor 40. Accordingly, the PTC thermistor 40 is not protruded from the overlap end portions 54 and 56.

Here, as illustrated in FIG. 5(a), the first overlap end portion 54 particularly has a fitting recessed portion 70 provided as a recess extending from a first surface 58 on the PTC thermistor 40 side to a second surface 60 on the opposite side. In this case, a method for forming the fitting recessed portion 70 is not particularly limited. For example, such as press processing that is processing involving pressing of a die may be used. The PTC thermistor 40 is fitted in this fitting recessed portion 70 from, for example, the upper end surface 46 side. The fitting recessed portion 70 is generally identical in plan view shape to the PTC thermistor 40. A length D1 in a depth direction is set shorter than the thickness H of the PTC thermistor 40. Accordingly, when the PTC thermistor 40 is fitted in the fitting recessed portion 70, its end portion on the lower end surface 47 side partially protrudes from the fitting recessed portion 70.

The lower end surface 47 of the PTC thermistor 40 partially protruding from the fitting recessed portion 70 is joined to the second overlap end portion 56 of the second lead half body 44. The second overlap end portion 56 is flat as it does not include a recess. Accordingly, the entire upper end surface 46 of the PTC thermistor 40 is covered with a bottom 71 of the fitting recessed portion 70. A part of the lateral surface 48 of the PTC thermistor 40 is covered with an inner peripheral surface 73 of the fitting recessed portion 70, and the entire lower end surface 47 of the PTC thermistor 40 is covered with the second overlap end portion 56. Meanwhile, a remaining part of the lateral surface 48 of the PTC thermistor 40 is left exposed. Thus, according to the present invention, the exposed surface of the PTC thermistor 40 can be reduced as compared with conventional PTC thermistors. The exposed surface, i.e., the remaining part of the lateral surface 48 of the PTC thermistor 40, is covered with a protective material 72 as illustrated in FIG. 5(b).

Resin is used as the protective material 72. It is preferable to use a resin having both oxygen resistance and alkali resistance as the resin. Specifically, it is preferable to use an alkali-proof epoxy resin. The alkali-proof epoxy resin is a synthetic resin not only having oxygen resistance peculiar to original epoxy resin but also having imparted alkali resistance. Since the alkali-proof epoxy resin has flexibility, it follows after expansion contraction of the PTC thermistor.

In the positive electrode lead 30 of the present invention, the exposed surface of the PTC thermistor 40 is small as described above. This makes it possible to reduce the amount of resin to be used as a protective material and to downsize the portion that incorporates the PTC thermistor 40. Accordingly, the positive electrode lead 30 of the present invention can easily be mounted on the batteries having smaller storage space. When an alkali-proof epoxy resin is used as a protective material in particular, it becomes possible to omit the step of coating the entire portion that incorporates the PTC thermistor with a large-sized masking tape made of polypropylene which is conventionally used for securing alkali resistance. This further contributes to downsizing the portion to be incorporated.

For example, the positive electrode lead 30 of the present invention is manufactured as shown below.

First, the first lead half body 42 provided with the fitting recessed portion 70, the PTC thermistor 40, and the second lead half body 44 are prepared. Then, soldering paste is applied to the fitting recessed portion 70 of the first lead half body 42. Meanwhile, soldering paste is applied to the surface of the second overlap end portion 56 of the second lead half body 44 on the PTC thermistor 40 side. Then, the PTC thermistor 40 is inserted into the fitting recessed portion 70 from the upper end surface 46 side. Then, the second overlap end portion 56 of the second lead half body 44 is connected to the lower end surface 47 of the PTC thermistor 40. At this point, the first lead half body 42 and the second lead half body 44 are disposed so as to be aligned as viewed from a plane and to be uneven as viewed from a side. In this state, the entire assembly is heated to melt the soldering paste and is then cooled to complete solder joining. After that, an exposed portion of the lateral surface 48 of the PTC thermistor 40, which is positioned between the first overlap end portion 54 and the second overlap end portion 56, is covered with an alkali-proof epoxy resin used as the protective material 72. As a result, the positive electrode lead 30 of the present invention is provided.

In the present invention, positioning of the PTC thermistor 40 can be achieved simply by fitting the PTC thermistor 40 in the fitting recessed portion 70. Accordingly, manufacturing is more facilitated than hitherto, and excellent manufacturing efficiency is achieved.

Second Embodiment

A description will be given of a battery of a second embodiment to which the present invention is applied.

The battery of the second embodiment is different from the battery 2 of the first embodiment only in the point that the battery includes a positive electrode lead 31 which also has a fitting recessed portion 84 provided in a second overlap end portion 82 of a second lead half body 80. Accordingly, members and portions which exhibit the functions identical to those in the disclosed first embodiment are designated by identical reference numerals to omit a description thereof and to provide a description of only those different from the first embodiment.

Figure 6:
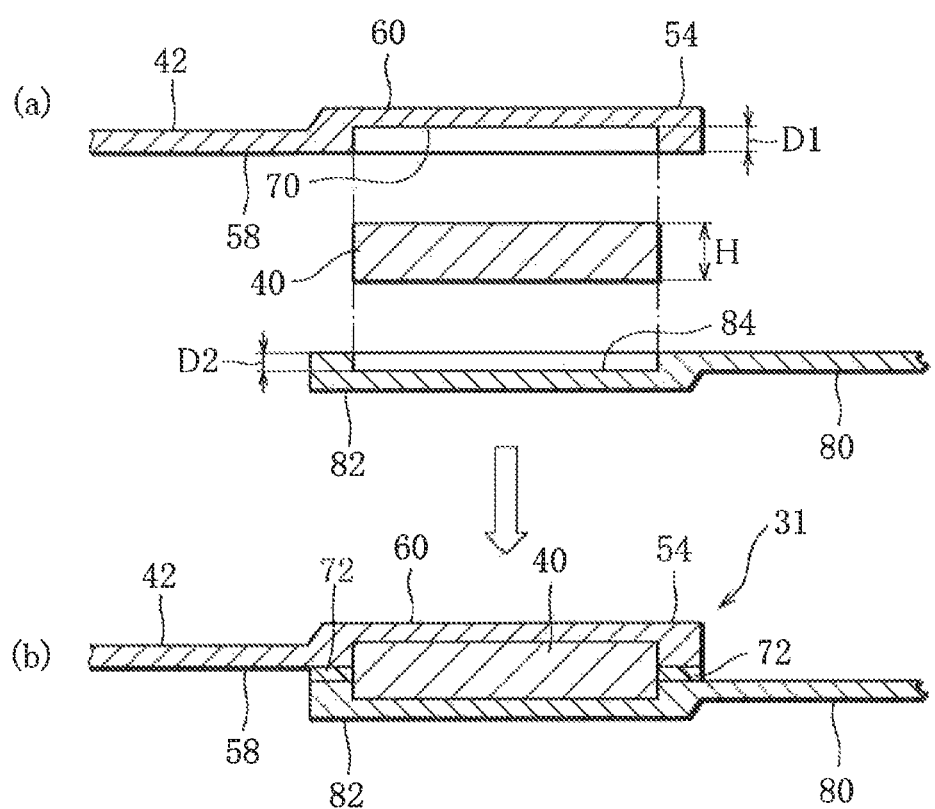
FIG. 6 is an explanatory view illustrating the configuration of a modification of the positive electrode lead according to the present invention.

First, as illustrated in FIG. 6, the second lead half body 80 according to the positive electrode lead 31 has a second fitting recessed portion 84 provided on the second overlap end portion 82, the second fitting recessed portion 84 being provided so that the PTC thermistor 40 can be fitted therein. This second fitting recessed portion 84 is similar in shape to the first fitting recessed portion 70 provided on the first lead half body 42. That is, the fitting recessed portion 84 is substantially identical in plan view shape to the PTC thermistor 40, and a length D2 in a depth direction is set shorter than the thickness H of the PTC thermistor 40. In this case, if the peripheries of the first overlap end portion 54 and the second overlap end portion 82 come into contact with each other when the first overlap end portion 54, the second overlap end portion 82, and the PTC thermistor 40 are stacked, electrical connection of the first overlap end portion 54, the second overlap end portion 82, and PTC thermistor 40 which are connected in series is disturbed. This disables current control by the PTC thermistor 40. Accordingly, it is necessary to prevent the first overlap end portion 54 and the second overlap end portion 82 from coming into contact with each other. Therefore, a sum of the depth D1 of the first fitting recessed portion 70 and the depth D2 of the second fitting recessed portion 84 is set smaller than the thickness H of the PTC thermistor, i.e., H>D1+D2 is satisfied.

When the first overlap end portion 54 and the second overlap end portion 82 are each provided with the fitting recessed portions 70 and 84 in this way, positioning of the PTC thermistor 40 at the time of manufacturing the positive electrode lead 31 is more facilitated. Moreover, since the PTC thermistor 40 is fitted in these fitting recessed portions 70 and 84, the first lead half body 42 and the second lead half body 80 can be controlled to be in a specified positional relationship. In short, it becomes possible to prevent the first lead half body 42 and the second lead half body 80 from being bent at a portion of the PTC thermistor 40 when the positive electrode lead 31 is viewed from a plane. Accordingly, linearity of the positive electrode lead 31 is maintained and morphological stability is further enhanced. When the morphological stability of the positive electrode lead 31 is enhanced in this way, the yield in battery manufacturing is further enhanced.

EXAMPLES

1. Battery Manufacturing

Example 1

As illustrated in FIG. 3, a generally rectangular plate-like PTC thermistor 40 was prepared which was 3 mm long (L), 3 mm wide (W), and about 1.0 mm thick (H) and whose operating temperature was 90° C. The corner parts of the PTC thermistor 40 are formed into a round shape.

As the first lead half body 42 and the second lead half body 44, band-shaped bodies made of nickel were prepared to have a thickness of about 0.2 mm. These first and second lead half bodies 42 and 44 include rectangular overlap end portions 54 and 56 having a length (L1) of 3.5 mm long and a width (W1) of 3.5 mm, and body portions 62 and 66 having a width (W2) of 3 mm wide as illustrated in FIG. 4. Between the overlap end portions 54 and 56 and the body portions 62 and 66, narrow portions 64 and 68 which were 2.5 mm wide (W3) and 1 mm long (L2) were provided.

Figure 5:
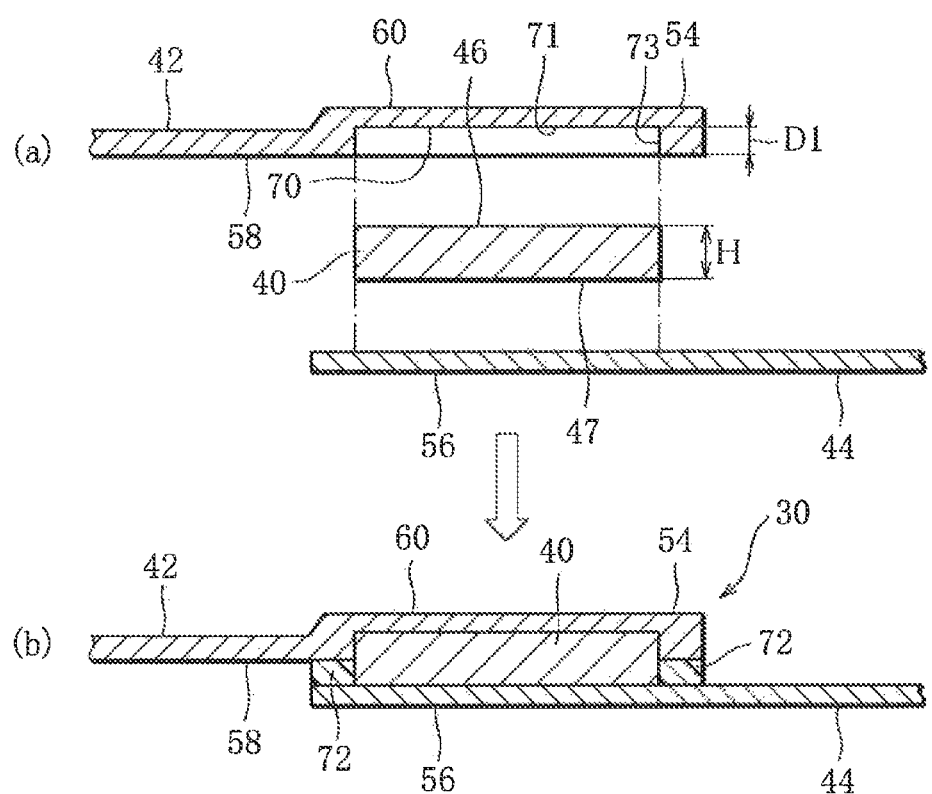
FIG. 5 is an explanatory view illustrating the configuration of the positive electrode lead according to the present invention based on a cross section along V-V line of FIG. 4.

Here, as illustrated in FIGS. 4 and 5, the overlap end portion 54 of the first lead half body 42 had a first fitting recessed portion 70 which was similar in plan view shape to the PTC thermistor 40. More specifically, the first fitting recessed portion 70 had a generally rectangular shape which was 3 mm long (L4), 3 mm wide (W4), and about 0.3 mm deep (D1).

The second overlap end portion 56 of the second lead half body 44 was flat as it did not have a recessed portion.

Next, soldering paste was applied to the bottom 71 of the first fitting recessed portion 70 in the first lead half body 42 and to the second overlap end portion 56 of the second lead half body 44. Then, the PTC thermistor 40 was fitted in the first fitting recessed portion 70 of the first lead half body 42 from the upper end surface 46 side. Next, the second overlap end portion 56 of the second lead half body 44 was laid on the lower end surface 47 of the PTC thermistor 40. At this point, the second lead half body 44 was disposed so that its body portion 66 extended in a direction opposite to the body portion 62 of the first lead half body 42. All the first lead half body 42, the PTC thermistor 40, and the second lead half body 44 were stacked, and the stacked parts were heated in this state. After the step of melting and cooling the soldering paste, soldering was completed.

Then, a gap around the PTC thermistor 40 and between the first overlap end portion 54 of the first lead half body 42 and the second overlap end portion 56 of the second lead half body 44 was filled with an alkali-proof epoxy resin. As a result, the entire exposed portion on the lateral surfaces 48 of the PTC thermistor was coated with a protective material 72. The positive electrode lead 30 of the first example was manufactured in this way.

By using the obtained positive electrode lead 30, a general nickel hydrogen storage battery of AAA size was fabricated. This battery is referred to as a battery a.

Comparative Example 1

A PTC thermistor 40 similar to the example 1 was prepared.

As a first lead half body 90 and a second lead half body 92, band-shaped bodies made of nickel were prepared to have a thickness of 0.2 mm. These first and the second lead half bodies 90 and 92 include body portions 94 and 96 having a width (W5) of 3 mm wide and tip portions 98 and 100 having a width (W6) of 2.5 mm, the tip portions 98 and 100 extending from these body portions 94 and 96 as illustrated in FIG. 7.

Next, soldering paste was applied to the tip portions 98 and 100 of the first lead half body 90 and the second lead half body 92. The soldering paste was applied to prescribed positions on the surfaces of the tip portions 98 and 100 which faced the PTC thermistor 40. Then, the tip portion 98 of the first lead half body 90 was laid on top of the upper end surface 46 of the PTC thermistor 40 held by a specialized tool. Meanwhile, the second lead half body 92 was placed so that its body portion 96 extended in a direction opposite to the body portion 94 of the first lead half body 90, and its tip portion 100 was laid on the lower end surface 47 of the PTC thermistor 40. In this state, all the stacked parts were heated, and through the step of melting and cooling the soldering paste, soldering was completed.

Figure 7:
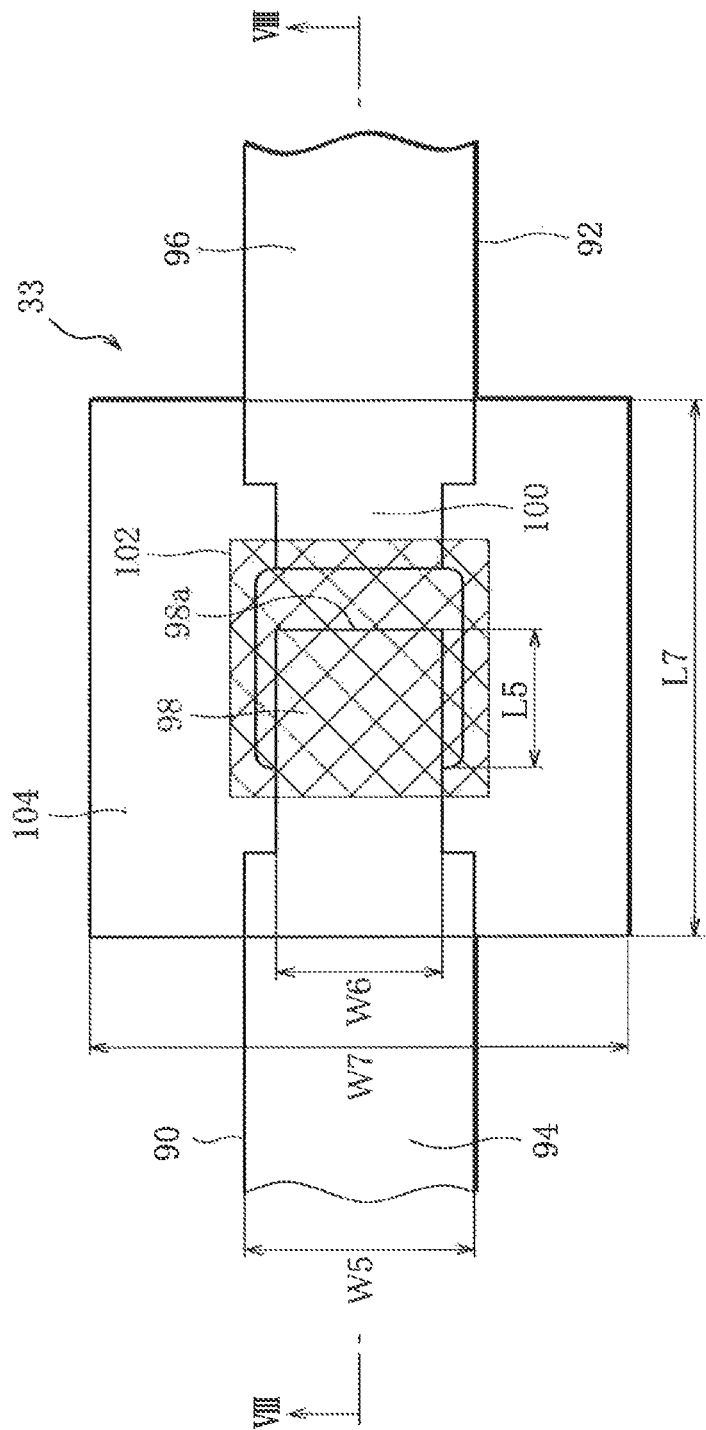
FIG. 7 is a plan view illustrating a positive electrode lead according to a comparative example equivalent to the conventional technology.
Figure 8:
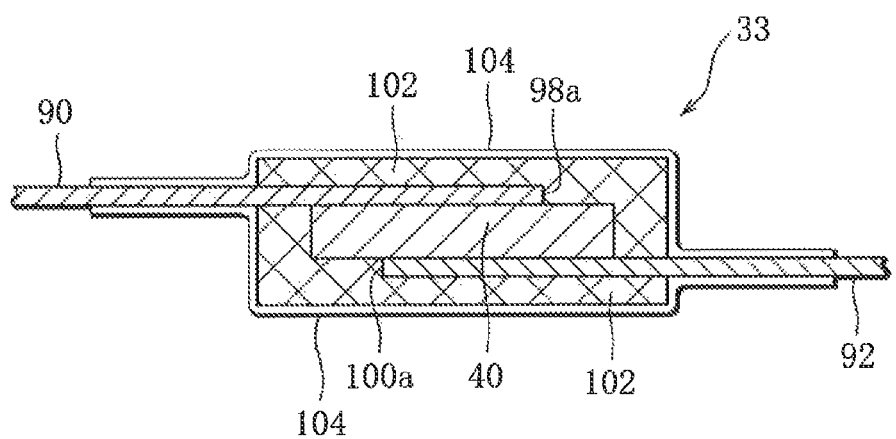
FIG. 8 is an explanatory view illustrating the configuration of the positive electrode lead according to the comparative example equivalent to the conventional technology based on a cross section along VIII-VIII line of FIG. 7.

In this comparative example 1, as illustrated in FIGS. 7 and 8, only a portion of the first lead half body 90 and the second lead half body 92 which was in the range of 2 mm in length (L5) from their top ends 98a and 100a was overlapped with the PTC thermistor 40. As a result, the PTC thermistor 40 in the comparative example 1 was exposed entirely in the lateral surface 48 and exposed partially in the upper and lower end surfaces 46 and 47. Accordingly, in the comparative example 1, an epoxy resin 102 was applied to the entire part where the PTC thermistor 40 was present, including the external surfaces of the tip portions 98 and 100, so as to cover all the exposed surfaces. Since the epoxy resin 102 is general resin which does not have alkali resistance, the entire part where the epoxy resin was applied was further coated with an alkali-resistant transparent masking tape 104 made of polypropylene to provide protection against an alkaline component. The masking tape 104 having a length (L7) of about 9 mm and a width (W7) of about 9 mm was made to cover the portion that incorporated the PTC thermistor 40 from the upper and lower sides. Thus, the positive electrode lead 33 of the comparative example 1 was manufactured. In the positive electrode lead 33 of this comparative example 1, the thickness of the epoxy resin coating is larger than that in the positive electrode lead 30 of the example 1. Furthermore, since the large-sized masking tape 104 is disposed on top of the epoxy resin, the portion that incorporates the PTC thermistor 40 is bulky as compared with the example 1.

By using the obtained positive electrode lead 33, a general nickel hydrogen storage battery of AA size was fabricated. This battery is referred to as a battery b.

Since the positive electrode lead 33 of the comparative example 1 was bulky as described above, it was not possible to incorporate the positive electrode lead 33 in the AAA-size nickel hydrogen storage battery.

Comparative Example 2

A general nickel hydrogen storage battery of AAA size was fabricated by using a general positive electrode lead which did not include a PTC thermistor. This battery is referred to as a battery c.

Example 2

A positive electrode lead was manufactured in the similar manner as in the example 1 except for the point of using a PTC thermistor whose operating temperature was 80° C.

By using the obtained positive electrode lead, a general nickel hydrogen storage battery of AAA size was fabricated. This battery is referred to as a battery d.

Example 3

A positive electrode lead was manufactured in the similar manner as in the example 1 except for the point of using a PTC thermistor whose operating temperature was 100° C.

By using the obtained positive electrode lead, a general nickel hydrogen storage battery of AAA size was fabricated. This battery is referred to as a battery e.

Example 4

A positive electrode lead was manufactured in the similar manner as in the example 1 except for the point of using a PTC thermistor whose operating temperature was 60° C.

By using the obtained positive electrode lead, a general nickel hydrogen storage battery of AAA size was fabricated. This battery is referred to as a battery f.

Example 5

A positive electrode lead was manufactured in the similar manner as in the example 1 except for the point of using a PTC thermistor whose operating temperature was 110° C.

By using the obtained positive electrode lead, a general nickel hydrogen storage battery of AAA size was fabricated. This battery is referred to as a battery g.

2. Evaluation of Batteries (1) Initial activation processing was performed on the obtained batteries a to c to make the batteries in a usable state. Then, the respective batteries were charged to a full charge state.

Next, the batteries a to c were put under 25° C. environment. Then, in the respective batteries, the positive electrode terminal and the negative electrode terminal were connected through a metal wire to cause an external short circuit. The surface temperatures of the respective batteries at that point were measured, and the highest surface temperature of the batteries on the occasion of the external short circuit were obtained. The obtained results are illustrated in Table 1 as the surface temperatures of the batteries.

TABLE 1

|  | Presence or absence of PTC | Operating temperature of PTC (° C.) | Exposed area of PTC | Presence or absence of protection against oxygen | Presence or absence of protection against alkaline | Surface temperature of battery (° C.) |
|---|---|---|---|---|---|---|
| Example 1 (battery a) | Present | 90 | Small | Present, Alkali-proof epoxy resin | Present, Alkali-proof epoxy resin | 52.5 |
| Comparative example 1 (battery b) | Present | 90 | Large | Present, Epoxy resin | Present, Polypropylene tape | 44.8 |
| Comparative example 2 (battery c) | Absent | — | — | — | — | 138.0 |

Table 1 indicates the following findings.

The positive electrode lead in the example 1 has larger overlap end portions than the PTC thermistor. In addition, the overlap end portions have a fitting recessed portion provided for the PTC thermistor. In this overlap end portions, the upper and lower surfaces as well as a part of the lateral surface of the PTC thermistor are covered, so that the exposed area of the PTC thermistor is smaller than that in the conventional PTC thermistor. Since the area of a portion of the PTC thermistor which should be covered is small, the amount of the resin to be used for protection can be reduced. Moreover, in the positive electrode lead of the example 1, protection against oxygen and protection against alkaline can be achieved only with alkali-proof epoxy resin. As a result, the protective measures for the PTC thermistor can be more simplified than before. This prevents the portion that incorporates the PTC thermistor from becoming bulky, and therefore the positive electrode lead of the example 1 can sufficiently be mounted on the AAA-size battery.

The positive electrode lead of the comparative example 1, which was a conventional positive electrode lead including the PTC thermistor, was mounted on the battery b. When an external short circuit occurred in the battery b, the battery b had a surface temperature of 44.8° C. Contrary to this, when an external short circuit occurred in the battery a in the example 1, the battery had a surface temperature of 52.5° C., which was higher by 7.7° C. than the battery b. It is considered that the temperature of the battery a became higher than that of the battery b because the battery a was an AAA-size battery smaller than the AA-size battery b, so that the temperature of the battery a easily increased. However, since the surface temperature of the battery a was lower than the domestic toy standard (the maximum exothermic temperature of the battery is 70° C. or less), it can be considered that heat generation can sufficiently be suppressed.

On the contrary, the battery c which did not incorporate the PTC thermistor generated heat up to about 138.0° C. when the external short circuit occurred. As compared with the battery c, the temperature of the battery a increased only to half the temperature of the battery c even when the external short circuit occurred. This also suggests that heat generation can sufficiently be suppressed.

As described in the foregoing, it can be said that the present invention enables the positive electrode lead that incorporates the PTC thermistor, which is bulky and difficult to mount on the AAA-size battery in the past, to be mounted on the AAA-size battery. In addition, the same effect of suppressing heat generation as before can also be implemented.

(2) Next, initial activation processing was performed on the obtained batteries a and d to g to put the batteries in a usable state. Then, the respective batteries were charged to a full charge state.

Then, these batteries were left under 60° C. environment for 2 hours, and under the same temperature environment, electric resistance values between the positive electrode terminals and the negative electrode terminals were measured. The results are illustrated in Table 2 as resistance values of the batteries under 60° C. environment.

Next, these batteries a and d to g were cooled to the room temperature, and were put under 25° C. environment. Then, in the respective batteries, the positive electrode terminal and the negative electrode terminal were connected through a metal wire to cause an external short circuit. The surface temperatures of the respective batteries at that point were measured, and the highest surface temperatures of the batteries on the occasion of the external short circuit were obtained. The obtained results are also illustrated in Table 2 as the surface temperatures of the batteries.

TABLE 2

|  | Operating temperature of PTC (° C.) | Resistance value of battery under 60° C. environment (Ω) | Surface temperature of battery (° C.) |
|---|---|---|---|
| Example 1 (battery a) | 90 | 0.020 | 52.5 |
| Example 2 (battery d) | 80 | 0.019 | 49.6 |
| Example 3 (battery e) | 100 | 0.019 | 62.3 |
| Example 4 (battery f) | 60 | 1020 | 44.2 |
| Example 5 (battery g) | 110 | 0.018 | 74.8 |

Table 2 indicates the following findings.

First, in the batteries a and d to g, the highest surface temperatures of the batteries on the occasion of the external short circuit at 25° C. were all lower than the highest surface temperature of the battery c, which did not incorporate the PTC thermistor, on the occasion of the external short circuit. Therefore, it can be said that the PTC thermistor effectively functions so that heat generation is suppressed.

Here, when the battery f in which the operating temperature of the PTC thermistor was set to 60° C. was put under 60° C. environment, the temperature of the PTC thermistor included therein also increased under the influence of environmental temperature. As a result, the current suppression function was triggered and the electric resistance value of the battery increased to about 1000Ω. Accordingly, in the case where the temperature of the environment on which the battery f is put reaches about 60° C., that is, when the battery f is put inside a car in the summer time, or the like, for example, the battery f may suppress current and disable apparatus operation even though the external short circuit does not occur in actuality. Contrary to this, in the case of the batteries a, d, e and g which are higher in the operating temperature of the PTC thermistor than the battery f, their resistance values are as low as 0.020Ω or less even under 60° C. environment. Therefore, it can be said that the same failure as in the battery f does not occur.

When these batteries caused an external short circuit under 25° C. environment, the surface temperatures of the batteries a and batteries d to f were 65.0° C. or less, but the surface temperature of the battery g increased to 74.8° C.

This indicated that the operating temperature of the PTC thermistor set too high for prevention of malfunction causes a relatively high surface temperature of the battery when the external short circuit does occur in actuality.

As is clear from the above, it can be said that the operating temperature of the PTC thermistor is preferably set in the range of 80° C. to 100° C. so as to prevent malfunction of the PTC thermistor and to satisfy the domestic toy standard (the maximum exothermic temperature of the battery is 70° C. or less) when an external short circuit actually occurs.

The present invention is not limited to the above-disclosed embodiments and examples, but various changes are possible. For example, the batteries to which the present invention is applied are not limited to the nickel hydrogen storage battery. The present invention is also applicable to other alkaline storage batteries. The PTC thermistor for use in the present invention is not limited to the rectangular PTC thermistor having rounded corners. PTC thermistors having corners in various shapes, such as square shapes including rectangular shapes, circular shapes, and triangular shapes, may also be adopted. In that case, the fitting recessed portion is formed into a shape that matches with the shape of the PTC thermistor.

EXPLANATION OF REFERENCE SIGNS

2 Nickel hydrogen storage battery
10 Outer can
11 Sealing body
12 Insulating packing material
14 Lid plate
20 Positive electrode terminal
24 Positive electrode
26 Negative electrode
28 Separator
30, 31, 33 Positive electrode lead
40 PTC thermistor
42 First lead half body
44 Second lead half body
72 Protective material

The invention claimed is:

1. An alkaline storage battery, comprising:
an outer can having an open upper end;
an electrode group including a positive electrode and a negative electrode that are stacked via a separator, the electrode group being housed in the outer can together with alkali electrolyte;
a sealing body fixed to an opening edge of the outer can in an insulated state, the sealing body having a lid plate that seals the opening and a positive electrode terminal electrically connected to the lid plate; and
a positive electrode lead that electrically connects the positive electrode and the sealing body, wherein
the positive electrode lead includes a first lead half body electrically connected to the sealing body, a second lead half body electrically connected to the positive electrode, and a PTC thermistor disposed between the first lead half body and the second lead half body,
the first lead half body and the second lead half body respectively have overlap end portions formed in a portion where the first lead half body and the second lead half body overlap with each other, the overlap end portions being larger than the PTC thermistor as viewed from a plane and being in contact with the PTC thermistor,
the PTC thermistor is fitted in a fitting recessed portion formed in the overlap end portion of at least one of the first lead half body and the second lead half body, and
only an exposed portion of the PTC thermistor which is not covered with the overlap end portions of the first lead half body and the second lead half body is covered with a protective material; and
wherein the overlap end portions and the PTC thermistor are sized and arranged so that the PTC thermistor does not protrude from the overlap end portions.

2. The alkaline storage battery according to claim 1, wherein
the protective material is made of resin having both oxygen resistance and alkali resistance.

3. The alkaline storage battery according to claim 2, wherein the PTC thermistor has operating temperature set to 80° C. to 100° C.

4. The alkaline storage battery according to claim 1, wherein the PTC thermistor has operating temperature set to 80° C. to 100° C.

5. An alkaline storage battery, comprising:
an outer can having an open upper end;
an electrode group including a positive electrode and a negative electrode that are stacked via a separator, the electrode group being housed in the outer can together with alkali electrolyte;
a sealing body fixed to an opening edge of the outer can in an insulated state, the sealing body having a lid plate that seals the opening and a positive electrode terminal electrically connected to the lid plate; and
a positive electrode lead that electrically connects the positive electrode and the sealing body, wherein
the positive electrode lead includes a first lead half body electrically connected to the sealing body, a second lead half body electrically connected to the positive electrode, and a PTC thermistor disposed between the first lead half body and the second lead half body,
the first lead half body and the second lead half body respectively have overlap end portions formed in a portion where the first lead half body and the second lead half body overlap with each other, the overlap end portions being larger than the PTC thermistor as viewed from a plane and being in contact with the PTC thermistor,
the PTC thermistor is fitted in a fitting recessed portion formed in the overlap end portion of at least one of the first lead half body and the second lead half body, and
an exposed portion of the PTC thermistor which is not covered with the overlap end portions of the first lead half body and the second lead half body is covered with a protective material; and further wherein the PTC thermistor has an upper end surface joined to the first lead half body and a lower end surface joined the second lead half body, wherein the first overlap end portion covers the entire upper end surface of the PTC thermistor and the second overlap end portion covers the entire lower end surface of the PTC thermistor.

6. The alkaline storage battery according to claim 5, wherein the exposed portion of the PTC thermistor is a lateral surface of the PTC thermistor.

7. The alkaline storage battery according to claim 6, wherein the lateral surface of the PTC thermistor extends between the upper end surface and the lower end surface.

8. The alkaline storage battery according to claim 6, wherein a part of the lateral surface of the PTC thermistor is covered with an inner peripheral surface of the fitting recessed portion.

\* \* \* \* \*